(12) United States Patent
Van Balen (10) Patent No.: US 9,714,528 B2
(45) Date of Patent: Jul. 25, 2017

(54) PRESENTATION DEVICE

(71) Applicant: Gripzo B.V., Klazienaveen (NL)

(72) Inventor: Robert Van Balen, Apeldoorn (NL)

(73) Assignee: GRIPZO B.V., Klazienaveen (NL)

( * ) Notice: Subject to any disclaimer, the term of this patent is extended or adjusted under 35 U.S.C. 154(b) by 98 days.

(21) Appl. No.: 14/595,416

(22) Filed: Jan. 13, 2015

(65) Prior Publication Data

US 2015/0300050 A1     Oct. 22, 2015

(30) Foreign Application Priority Data

Jan. 13, 2014    (NL) .................................... 2012079

(51) Int. Cl.
*E05B 73/00*      (2006.01)
*F16M 11/04*     (2006.01)
(Continued)

(52) U.S. Cl.
CPC ............ *E05B 73/00* (2013.01); *A47F 5/0087* (2013.01); *A47F 5/0861* (2013.01); *A47F 7/024* (2013.01);
(Continued)

(58) Field of Classification Search
CPC .. E05B 73/00; E05B 73/0082; Y10T 70/5009; F16M 11/04; F16M 11/041;
(Continued)

(56) References Cited

U.S. PATENT DOCUMENTS 7,007,912 B1 *   3/2006   Giuliani ............. E05B 73/0082
                                                                     248/552
7,918,427 B2 *   4/2011   Wang ..................... F16M 13/00
                                                                     248/278.1
(Continued)

FOREIGN PATENT DOCUMENTS

TW      EP 2608493 A1 *   6/2013   ............. B60R 11/02
WO      2012137007 A1       10/2012

OTHER PUBLICATIONS

Search Report and Written Opinion received in corresponding NL Application No. 2012079 dated Jan. 13, 2014, 7 pgs.
(Continued)

*Primary Examiner* — Ryan Kwiecinski
(74) *Attorney, Agent, or Firm* — Browdy and Neimark, PLLC (57) ABSTRACT

The invention relates to a presentation device for presenting a hand-held electronic media display unit, comprising:
  a support comprising a foot provided with a support surface;
  a number of frame parts mounted on the support and provided with hooks, wherein the support surface and the hooks of the frame parts together form an enclosing space in which the unit can be held, wherein the frame parts extending along one side of the enclosing space take a displaceable form;
  a guide which is embodied to guide the displacement of the displaceable frame parts, wherein the guide is embodied to guide the displaceable frame parts
(Continued)

between a first, closed state in which the display unit is non-removable and a second, open state in which the display unit can be easily placed in the device and can be easily removed again therefrom, wherein the position of the respective hooks of the frame parts in the opened state and the position thereof in the closed state are spatially remote from each other both in a direction in the plane of the support surface and in a direction transversely of the support surface.

14 Claims, 7 Drawing Sheets (51) Int. Cl.
*F16M 13/02* (2006.01)
*B60R 11/02* (2006.01)
*A47F 7/02* (2006.01)
*A47F 7/024* (2006.01)
*A47F 5/00* (2006.01)
*A47F 5/08* (2006.01)
*F16M 11/08* (2006.01)
*H04M 1/04* (2006.01)
*F16M 11/10* (2006.01)
*B60R 11/00* (2006.01)

(52) U.S. Cl.
CPC ........ *A47F 7/0246* (2013.01); *B60R 11/0252* (2013.01); *E05B 73/0082* (2013.01); *F16M 11/041* (2013.01); *F16M 11/08* (2013.01); *F16M 11/10* (2013.01); *F16M 13/02* (2013.01); *H04M 1/04* (2013.01); *B60R 2011/0071* (2013.01); *F16M 2200/024* (2013.01); *Y10T 70/5009* (2015.04)

(58) Field of Classification Search
CPC .... F16M 11/2021; F16M 13/00; F16M 13/02; B60R 2011/0071; B60R 11/0252; A47F 7/0246
See application file for complete search history.

(56) References Cited

U.S. PATENT DOCUMENTS

| | | | | |
|---|---|---|---|---|
| 8,636,257 B2* | 1/2014 | Tsou | ................... | B60R 11/02 248/121 |
| 8,701,452 B2* | 4/2014 | Foster | ................ | E05B 73/0082 248/316.1 |
| 8,864,089 B2* | 10/2014 | Hung | ................... | F16M 11/041 248/122.1 |
| 2004/0257753 A1* | 12/2004 | Rossini | ............... | E05B 73/0082 361/679.27 |
| 2009/0090839 A1* | 4/2009 | Lin | ......................... | B60R 11/02 248/676 |
| 2009/0212189 A1 | 8/2009 | Carnevali | | |
| 2010/0038505 A1* | 2/2010 | Sonnenberg | ......... | F16M 11/041 248/226.11 |
| 2010/0108828 A1* | 5/2010 | Yu | ......................... | F16M 11/041 248/123.11 |
| 2010/0148030 A1* | 6/2010 | Lin | ................... | B60R 11/0252 248/371 |
| 2011/0024587 A1* | 2/2011 | Tsai | ..................... | A47K 10/10 248/206.2 |
| 2012/0018599 A1* | 1/2012 | Tsai | ......................... | F16B 47/00 248/206.3 |
| 2012/0037783 A1* | 2/2012 | Alexander | ............... | A47F 7/024 248/551 |
| 2012/0312950 A1* | 12/2012 | Sears | ................... | F16M 11/041 248/316.5 |
| 2013/0148273 A1* | 6/2013 | Tsai | ................... | F16M 11/041 361/679.01 |
| 2015/0285432 A1* | 10/2015 | Johnson | ............... | F16M 13/022 248/476 |
| 2015/0292669 A1* | 10/2015 | Floersch | ............... | G06F 1/1626 248/553 |

OTHER PUBLICATIONS

European Search Report from counterpart European Application No. 15150880.0/1653, dated Jun. 11, 2015, 9 pp.

* cited by examiner

FIG. 5C

PRESENTATION DEVICE

FIELD OF THE INVENTION

The invention relates to a presentation device for presenting a hand-held electronic media display unit.

BACKGROUND OF THE INVENTION

Hand-held electronic display units (also referred to as portable electronic display devices) such as tablet computers, mobile telephones and the like are configured to display media on a screen, for instance graphic information such as still images or video footage, and/or to play sound (music, speech and the like). These display units are popular, and can be purchased in a wide variety in shops. In order to present the media display units to potential customers they are secured in presentation devices which are in turn connected fixedly to a base surface, for instance a display counter or a wall.

Presentation devices for presenting such display units usually have a dual purpose: they must prevent a customer from being able to steal the unit, but at the same time it must be possible to view the unit properly and preferably also operate it. It is moreover preferable that the customer can also hold the unit as he/she normally would during use.

Many shops secure the objects by attaching a cable to the unit, wherein this cable is in turn connected to a fixed point. Other common systems use sensors, wherein an alarm sounds as soon as the product is removed a certain distance from a station. There are also systems where the unit is enclosed in a holder.

Each of these solutions have drawbacks however. In the case of cable systems the screen and the keys of a display unit are readily accessible, but a customer can for instance not properly assess how the device lies in the hand: both the weight and the shape are changed by the attaching mechanism. The presented units are moreover often damaged by these adhering systems, whereby they can no longer be sold.

Systems with alarm can be presented easily but are less suitable for theft prevention. This is because an alarm only works if there is an employee who can intervene when the alarm goes off and can actually prevent the theft, and when it is busy the implementation of this method requires a very large number of available and alert employees.

Systems with holders often work well in respect of theft prevention. The application of holders also has advantages in respect of the manner of presenting the display unit: the units can be viewed in the holder, and buttons and/or a touchscreen can be tested properly. It is not possible for the customer to get to know how the apparatus lies in the hand, since release of the unit from the holder is often a time-consuming process requiring a screwdriver or Allen key and usually both hands, and wherein the presentation device comes apart in several pieces. A further drawback is that holders are often only suitable for one specific product and cannot be adjusted in size.

There is a need for a presentation device with which storage of the display unit in and removing the display unit from the presentation device can be performed quickly and efficiently, with less risk of damaging the display unit (particularly at the position of the screen of the display unit). There is in addition a need to be able to accomplish this without needing both hands to do so, so that the display unit can be grasped with at least one hand when the user takes hold of and removes the display unit.

SUMMARY OF THE INVENTION

According to a first aspect, a presentation device is provided for presenting a hand-held electronic media display unit (portable electronic media display device) such as a tablet computer, the presentation device comprising:
  a support for supporting the display unit, the support comprising a foot which is provided with a support surface and which is to be attached to or placed on a base surface and/or provided with an alarm unit;
  a number of frame parts mounted on the support and provided with hooks, wherein the support surface and the hooks of the frame parts together form an enclosing space in which the unit can be held, wherein the frame parts extending along one side of the enclosing space take a displaceable form relative to the support surface of the support;
  a guide which is embodied to guide the displacement of the displaceable frame parts; wherein the guide is embodied to guide the displaceable frame parts between a first, closed state in which the display unit is non-removable and a second, open state in which the display unit can be easily placed in the device and can be easily removed again therefrom, wherein the position of the respective hooks of the frame parts in the opened state and the position thereof in the closed state are spatially remote from each other both in a direction in the plane of the support surface and in a direction transversely of the support surface.

Provided according to a second aspect is a presentation device for presenting a hand-held electronic media display unit (portable electronic media display device) such as a tablet computer, the presentation device comprising:
  a support for supporting the display unit, the support comprising a foot which is provided with a support surface and which is to be attached to or placed on a base surface and/or provided with an alarm unit;
  a number of frame parts mounted on the support and provided with hooks, wherein the support surface and the hooks of the frame parts together form an enclosing space in which the unit can be held, wherein the frame parts extending along one side of the enclosing space take a displaceable form relative to the support surface of the support;
  a guide which is embodied to guide the displacement of the displaceable frame parts, wherein the guide is embodied to guide the displaceable frame parts between a first, closed state in which the display unit is substantially non-removable and a second, open state in which the display unit can be easily placed in the device and can be easily removed again therefrom,
  a locking mechanism for locking the displaceable frame parts in the first, closed state, wherein the locking mechanism is configured to come into operation during displacement of the displaceable frame parts to the first, closed state.

Further features, details and advantages of the present invention will be elucidated on the basis of the following description of some embodiments thereof. Reference is made in the description to the figures.

DETAILED DESCRIPTION

The presentation device can for instance comprise:
- a support for supporting the display unit, the support comprising a foot which is provided with a support surface and which is to be attached to or placed on a base surface and/or provided with an alarm unit;
- a number of frame parts mounted on the support and provided with hooks, wherein the support surface and the hooks of the frame parts together form an enclosing space in which the unit can be held, wherein the frame parts extending along one side of the enclosing space take a displaceable form relative to the support surface of the support;
- a guide which is embodied to guide the displacement of the displaceable frame parts; wherein the guide is embodied to guide the displaceable frame parts between a first, closed state in which the display unit is non-removable and a second, open state in which the display unit can be easily placed in the device and can be easily removed again therefrom, wherein the position of the respective hooks of the frame parts in the opened state and the position thereof in the closed state are spatially remote from each other both in a direction in the plane of the support surface and in a direction transversely of the support surface.

In the closed state the display unit is held fixedly in the enclosing space and so cannot be separated from the presentation device (not at least without damaging the display device). The presentation device itself can be attached to a base surface (display counter, wall and so on) so that a thief cannot simply carry off the display unit. The presentation device can in addition or instead be provided with an alarm installation. The alarm installation can for instance comprise a sensor which ensures that an alarm will sound when the presentation device comes to lie too far away from the base surface, for instance because a thief carries off the presentation device with contents. When the enclosing space is opened, the frame part is displaced from a first (end) position, in which the hook remains positioned behind an edge of the display unit and the enclosing space is thus closed, to a second (end) position in which the hook is displaced parallel to the support surface (for instance outward) as well as perpendicularly of the support surface (for instance in the direction of the foot, i.e. downward when the foot is placed on top of a horizontal surface), and the associated edge of the display unit thus comes to lie completely clear. In this situation the display unit can be removed in simple manner without the chance of parts thereof, such as the screen, being damaged.

The enclosing space can take numerous forms. In many cases however the enclosing space is a substantially flat rectangular space for receiving a similarly shaped display unit therein. The frame parts, which are for instance formed by arms displaceable relative to the support and provided at the outer ends with hooks, are then arranged along each of the four sides of the enclosing space. The hooks thus surround and hold the display unit fixedly with said hooks, so that the display unit is held in the enclosing space and the greater part of the display unit, in particular the screen thereof, is still accessible by the purchaser.

In an embodiment only the one or more frame parts arranged along one side of the enclosing space are displaceable via the guide. The other frame parts can then be embodied such that they are not displaceable, at least not via the guide. In determined embodiments the other frame parts are still adjustable, particularly before a display unit has been arranged, although these other frame parts are preferably not displaceable during use, so with display unit arranged. These frame parts thus remain stationary.

In a further embodiment the presentation device comprises a locking mechanism for locking the displaceable frame parts in the first, closed state. The locking mechanism can comprise a lock or the like. The locking mechanism preferably requires a key or other identification for unlocking purposes. In a shop this can for instance be done by the shop assistant.

In a further embodiment the locking mechanism is embodied to come into operation (i.e. to lock) upon displacement of the displaceable frame parts to the first, closed state. When an operating person pushes the adjustable frame parts to the closed state a locking will automatically occur in this embodiment as soon as frame parts have reached the closed state. In yet another embodiment the presentation device comprises one or more biasing members for biasing the one or more displaceable frame parts to the second, opened state. In this embodiment the device can thus be embodied to displace the displaceable frame parts directly to the opened state under the influence of the biasing members, for instance one or more tension or compression springs, when the locking mechanism is unlocked, for instance by turning a key.

Further manual intervention is thus not possible, so that the operating person has his/her hands free to grasp the display unit.

The above stated displacement of the displaceable frame parts between the two different end positions can be realized in different ways. In a determined embodiment the displaceable frame parts are displaceable between the positions via the guide in a first movement in the plane of the support surface and in a second movement transversely of the plane of the support surface. The frame parts are for instance first displaced outward when opened. As soon as the hook of a frame part has been carried beyond the edge of the display unit, the hook of the frame part can be displaced downward (without the risk of the hook touching the edge) until the enclosing space is left clear in one direction of movement. In another embodiment the frame parts are displaceable between the positions via the guide in a combined movement in the plane of the support surface and transversely of the plane of the support surface, for instance by displacing an outer end of the frame part in an arcuate path.

In embodiments one or more spring units are arranged in the support surface for the purpose of pressing the display unit under spring force against the hooks of the frame parts. An advantage hereof is that a good connection of the display unit to the hooks can be realized and the display unit will have less of a tendency to start rattling in the enclosing space. If the spring travel of the spring units is sufficiently great, it is hereby also possible to realize that the presentation device is suitable for enclosing display units of different thicknesses, this without additional steps, such as adjustment of the frame parts and the like, being necessary here.

The spring unit can comprise one or more compression springs. These can for instance be mounted on the support surface, for instance in a number of openings provided therein, wherein an outer end protrudes from the support surface. During use the outer end can press against the rear side of the display unit so that it remains pressed against the hooks of the frame parts. In other embodiments the spring unit comprises, in addition to the compression spring, a tongue mounted on the support surface and pivotable relative thereto. The compression spring presses the free outer end of the tongue against the rear side of the display unit so that it is pressed against the frame parts. In order to obtain a good distribution of forces use is often made in practice of a number of spring units, for instance six, distributed more or less uniformly over the area of the end surface, so that the display unit is also pressed uniformly against the frame parts.

In order to make the presentation device suitable for display units of differing dimensions, the position of at least one of the frame parts (preferably of all frame parts) is adjustable relative to the support surface so as to make the presentation device suitable for display units with differing dimensions. The adjustability is realized by an adjusting mechanism. The adjusting mechanism is arranged here such that in practice it is inaccessible when the presentation device is in the first, closed state and a fitting display unit is enclosed in the device. The presentation device cannot be adjusted when the display unit has been thus arranged.

In an embodiment a pivoting unit is arranged between the foot and the support surface for the purpose of pivoting the support surface and fixing thereof in a desired position. While the foot is for instance fixed onto a surface and is substantially stationary (in the case of a stationary surface), the support surface and thereby the orientation of the display unit can be changed. The pivoting unit can more particularly be embodied to rotate the support surface with enclosing space over one or more axes, whereby the angle of a display unit present in the device can be changed.

According to said second aspect, the presentation device can comprise:
- a support for supporting the display unit, the support comprising a foot which is provided with a support surface and which is to be attached to or placed on a base surface and/or provided with an alarm unit;
- a number of frame parts mounted on the support and provided with hooks, wherein the support surface and the hooks of the frame parts together form an enclosing space in which the unit can be held, wherein the frame parts extending along one side of the enclosing space take a displaceable form relative to the support surface of the support;
- a guide which is embodied to guide the displacement of the displaceable frame parts, wherein the guide is embodied to guide the displaceable frame parts between a first, closed state in which the display unit is non-removable and a second, open state in which the display unit can be easily placed in the device and can be easily removed again therefrom;
- a locking mechanism for locking the displaceable frame parts in the first, closed state, wherein the locking mechanism is configured to come into operation during displacement of the displaceable frame parts to the first, closed state.

The presentation device can lock an object such as a display unit by closing round it. The presentation device can further be unlocked in simple manner, whereby the unit can if necessary be quickly removed from the holder. The device is here adjustable in determined embodiments, whereby it is suitable for units with a range of dimensions. In other embodiments the other frame parts (other than the frame parts displaceable via the guide) are mounted fixedly on the support surface and adjustment of the dimensions is thus not possible. These embodiments have a simplified construction.

Figure 1:
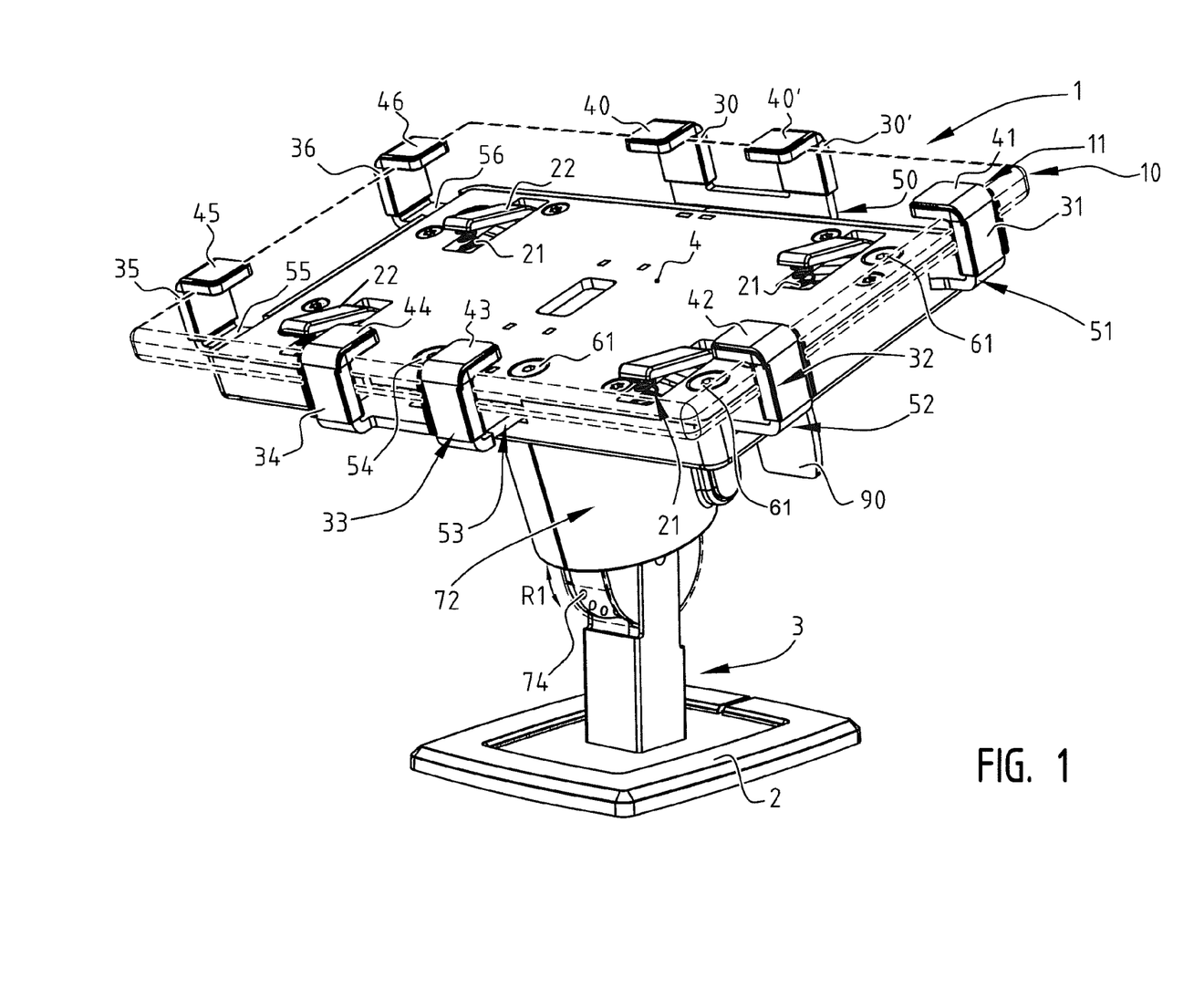
FIG. 1 is a perspective view of an embodiment of the whole presentation device.

FIG. 1 shows a specific embodiment of a presentation device 1. The presentation device comprises a support 3 with a foot 2 which is attached to a base surface (not shown). In the shown situation the foot is attached to a horizontal surface, such as a tabletop, for instance by means of fixedly screwing the foot onto the surface. In other embodiments the surface can take a vertical or inclining form and/or the foot can be attached in other manner to the surface. Support 3 of presentation device 1 further comprises a support element, also referred to here as the support surface, since the side facing toward the display unit takes a substantially flat form. As set forth below, in the shown embodiment the support surface 4 is embodied for pivoting (more particularly for pivoting along one axis or, preferably, two or more orthogonal axes) relative to foot 2.

The figures show with broken lines 10 where the tablet or other portable media display unit is located in the closed situation. The broken lines hereby indicate the (imaginary) enclosing space 11 in which the display unit can be enclosed. The display unit usually has a substantially flat and rectangular form. The large, flat side were the (touch) screen is generally located is also referred to here as the front, and the associated direction is described as "forward" direction. As a rule a portable media display unit has a short and a long side. The short sides will be designated with left and right, the long sides with lower and upper. It will be apparent that the invention is not only applicable to such presentation devices. Presentation devices with other shapes and dimensions likewise fall within the scope of the invention.

In the closed situation the rear side of the portable media display unit extends parallel to support surface 4, wherein the rear side lies either against support surface 4 or at a short distance therefrom. A number of frame parts 50-53, 55, 56 are arranged on the support. These frame parts 50-53, 55, 56 are embodied in the shown embodiment as gripper arms. Each of the frame parts comprises a hook-shaped part or hook at the free outer end (i.e. the outer end not attached to the support). A hook-shaped part comprises an upright stop part 30, 30', 31-36 and a lying stop part 40, 40', 41-46 so that the display unit can be enclosed not only in lateral (sideways) directions, but also in an upward direction.

The support surface and frame parts 50-53, 55 and 56 together form the above stated enclosing space 11. They can surround the display unit on all six sides. The rear side of the display unit is enclosed by support surface 4, the upper edge of the display unit by upright stop parts 30, 30' and lying stop parts 40, 40' of frame part 50, the lower edge of the display unit by upright stop parts 33, 34 and lying stop parts 43, 44 of respective frame parts 53, 54, the left-hand side edge of the display unit by upright stop parts 35, 36 and lying stop parts 45, 46 of the respective frame parts 55, 56, and the right-hand side edge of the display unit by upright stop parts 31, 32 and lying stop parts 41, 42 of the respective frame parts 51, 52.

The frame parts are formed and positioned such that they can already hold the display unit in the enclosing space by engaging on only the peripheral edge of the display unit. The shape and position of each of the frame parts moreover make it possible that the front side of the display unit is only very partially covered and therefore remains visible and accessible to a user wishing to look at and try out the display unit. The user can for instance be an interested customer who wishes to know before purchasing how the controls of a display unit work and what the screen looks like.

The portable media display unit can have openings on the sides, upper side and lower side, for instance for connection of cords and control buttons. Since upright stop parts 30, 30', 31-36 are quite thin, these openings are generally still accessible when the portable media display unit is located in the presentation device.

Provided in support surface 4 are four openings 27 in which four compression springs 21 are mounted. Pusher tongues 22 are further arranged on the support surface. Each of these tongues 22 is pivotally connected at one outer end to support surface 4. The opposite outer end is a free outer end. Compression spring 21 can press against the underside of the free outer end of a tongue 22 so that the tongue is pushed upward under spring force. Tongues 22 in turn press a display unit arranged in the enclosing space forward so that the front side of the display unit is pressed against the lying stop parts 40, 40', 41-46 of the frame parts. The size and spring tension of these compression springs is such that the presentation device can enclose display units of differing thicknesses, provided the thickness is no greater than the distance between lying stop parts 40, 40', 41-46 of the hooks and the support surface 4.

Figure 2:
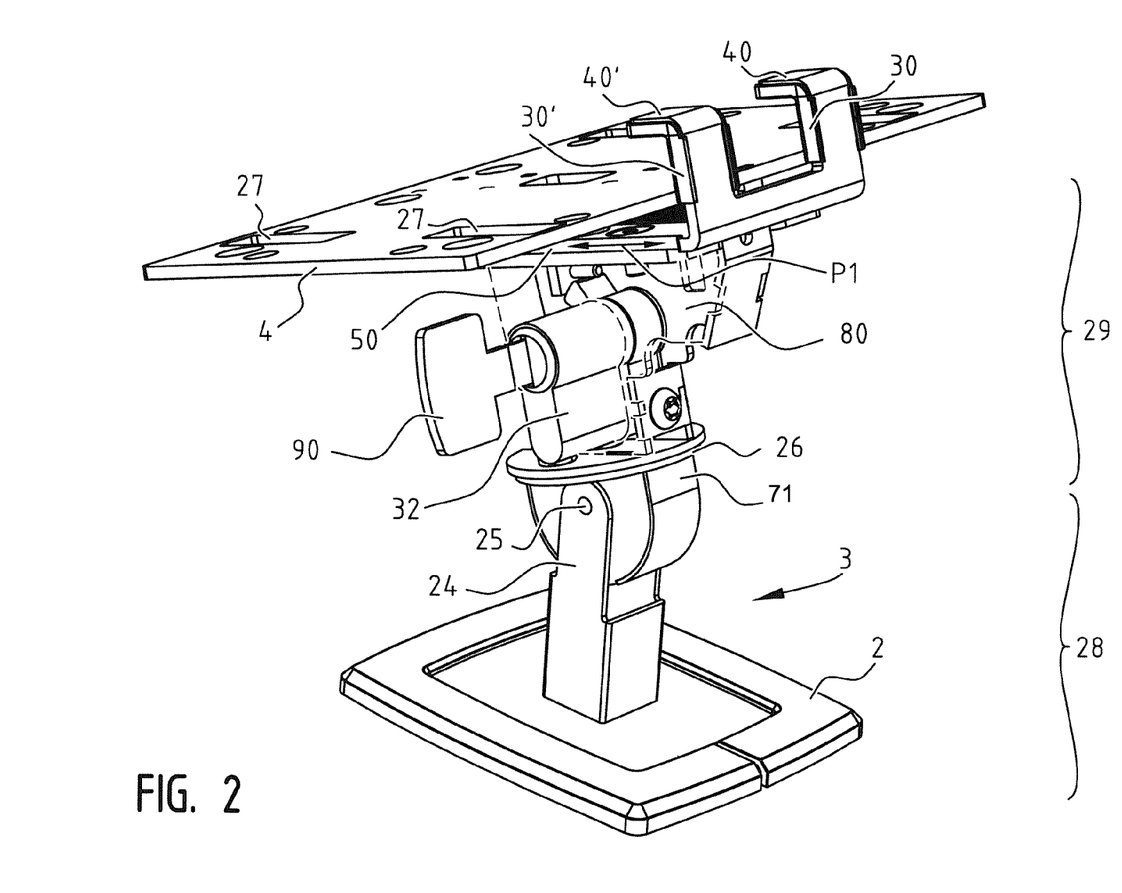
FIG. 2 is a perspective view from a different angle of this embodiment of the presentation device, wherein a number of elements are not shown, such as the frame parts which are only adjustable but not displaceable during use.

Referring to FIG. 2, foot 2 of support 3 comprises a lower support part 28 and an upper support part 29. The upper and lower support parts 28,29 take a mutually pivotable form via a pivoting unit. It is hereby possible to pivot support surface 4 in one or more directions relative to the base surface. The pivoting unit which makes this pivoting possible is shown in FIGS. 1 and 2.

FIG. 1 shows a protective sleeve 72 round the pivoting unit, which sleeve is not shown in FIG. 2 for the sake of clarity. The lower foot part 28 is provided with a suspension fork 24 in which a shaft 25 is mounted. Shaft 25 carries a rotatable wheel 71, on which wheel a support plate 26 is arranged. Support plate 26 forms part of upper foot part 29. The wheel enables rotation ($R_1$) of upper foot part 29 around shaft 25 so that support surface 4 can be brought into a desired orientation relative to the base surface. As shown in FIG. 1, a number of openings 74 are arranged in the peripheral edge of the wheel. A pin can be arranged herein which, in co-action with a stop, can ensure that upper foot part 29 can be fixed in the correct pivot position relative to lower foot part 28. In the shown embodiment shaft 25 forms the only pivot axis. In other embodiments a pivoting can also take place over more axes.

Upper foot part 29 comprises a support element 80 with which support plate 26 is connected via an upright plate-like part 81 (FIG. 2) to support surface 4. Support surface 4 and support plate 26 are more particularly connected fixedly to each other. A locking mechanism, which will be discussed in more detail below, is arranged on support element 80. Frame parts 30,30' are displaceable relative to support element 80 (and so also displaceable relative to support surface 4) in a lateral direction (see the double arrows $P_1$ in the figures).

Figure 3:
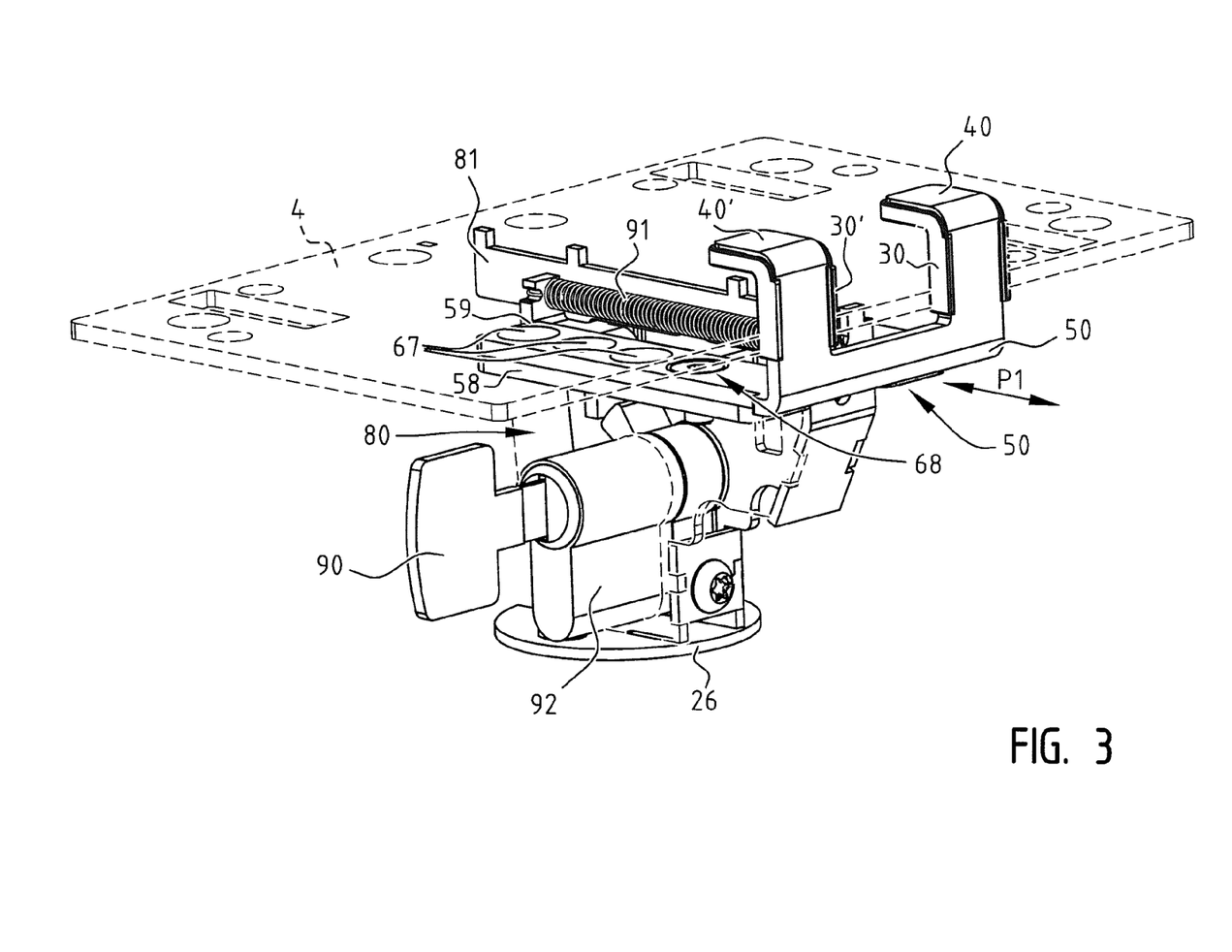
FIG. 3 is a perspective view of the presentation device in the first position, wherein the displaceable frame part is in a retracted, closed state.
Figure 4:
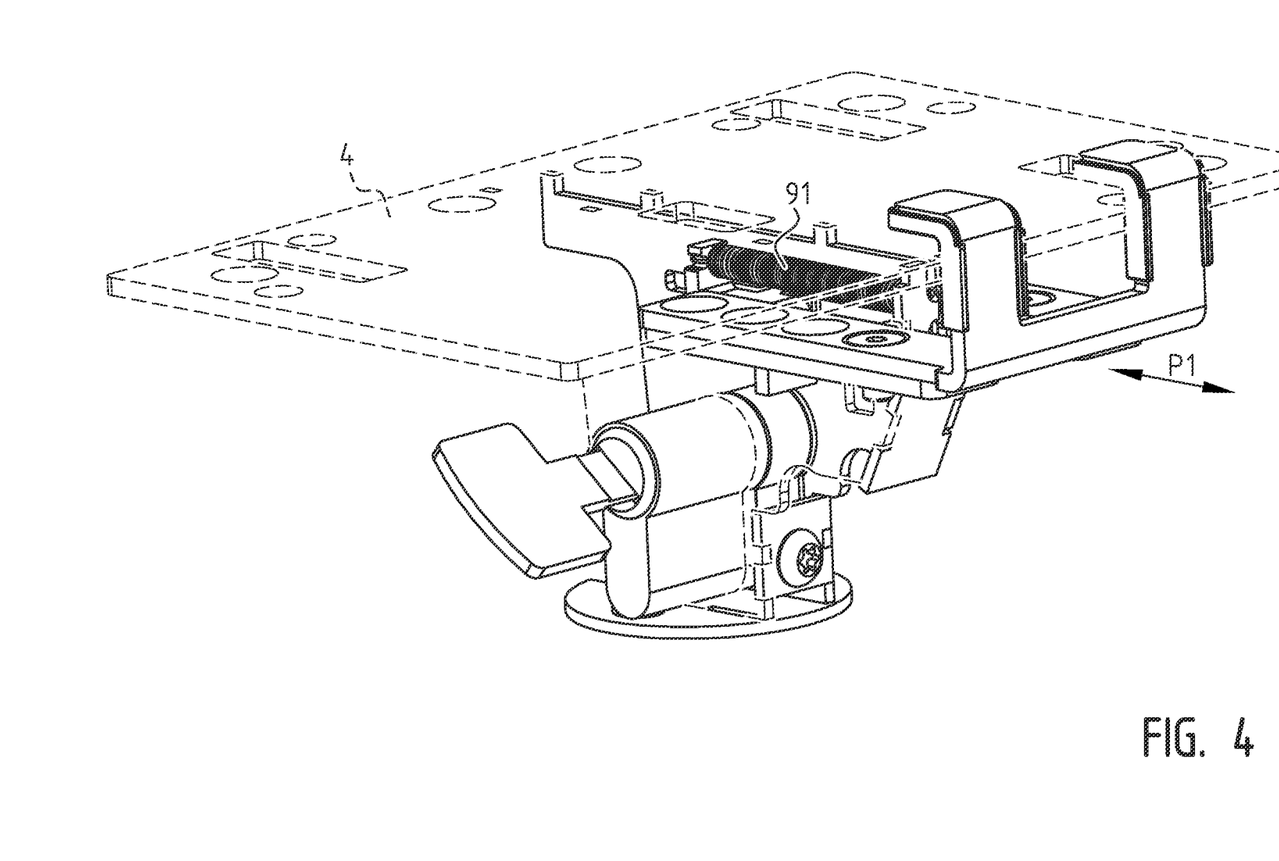
FIG. 4 is a perspective view of the presentation device in an intermediate position.

The hook comprising upright stop part 30 and lying stop part 40, and the hook comprising upright stop part 30' and lying stop part 40' are both part of the single frame part 50 or gripper arm. This frame part (gripper arm) 50 can be displaced in a first direction $P_1$ in the plane of support surface 4 (FIGS. 3 and 4) and in a second direction $P_2$ in a direction transversely of the first direction, more particularly transversely of the support surface 4 (FIGS. 4 and 5B). More particularly, a guide slot 85 is arranged in plate-like part 81 of support element 80. The slot comprises a slot part 86 parallel to support surface 4 and a slot part 87 transversely of support surface 4 and extending downward. Provided on the displaceable frame part (gripper arm) 50, more particularly on the lower profile part 58 thereof, are a first connecting piece 89 and a second connecting piece 84. The two connecting pieces 84, 89 ensure that the form of slot 85 is followed during the displacement of frame part 50. Connecting piece 84 first moves outward through horizontal part 86 of slot 85 and then downward through vertical part 87. Frame part (gripper arm) 50 is in this way displaceable between two end positions: a fully retracted end position (FIG. 3) wherein the frame part (gripper arm) 50 lies closely against the portable media display unit, and a fully extended position (FIG. 5A) which allows removal of the unit. The position shown in FIG. 4 is an intermediate position.

As a result of this two-fold movement, storage space 11 is only enclosed on five sides when frame part (gripper arm) 50 is in the second extended situation: on the rear side still by support surface 4, on the underside by upright stop parts 33 and 34 of frame part 54, on the sides by upright stop parts 31, 32, 35 and 36 of respective frame parts 51, 52, 55 and 56, and on the front side by lying stop parts 41-46 of respective gripper arms 51, 52, 53, 55 and 56. Since enclosing space 11 is no longer enclosed on one side owing to the first displacement (direction $P_1$) and the hooks comprising upright stop parts 30, 30' and lying stop parts 40, 40' have been pushed aside as a result of the second displacement (in the direction $P_2$), the portable media display unit can easily be taken out on this side with less risk of damage.

A spring 91 is arranged between a mounting part 88 (FIG. 5A) of the stationary upper foot part 29 and guide support 95 of displaceable frame part (gripper arm) 50. This spring 91 is a biased tension spring arranged for the purpose of pulling the gripper arm outward in lateral direction. Displaceable frame part (gripper arm) 50 thus tends to slide of its own accord to the opened position (i.e. under the spring force, without the user having to operate frame part (gripper arm) 50). Spring 91 is more particularly biased such that, when the locking mechanism (to be described below) is unlocked, frame part (gripper arm) 50 automatically displaces in the above described manner, i.e. laterally in first direction $P_1$ and then downward in a second direction $P_2$.

Frame part (gripper arm) 50 can be locked in the retracted state via the locking mechanism. The locking mechanism comprises a lock 92 which in the locked situation (as shown in FIG. 3) locks the displacement of the displaceable frame part (gripper arm) 50. When lock 92 is unlocked by turning the key 90 of lock 92, frame part (gripper arm) 50 will immediately spring open under the influence of spring 91 to the opened position shown in FIG. 5A.

Figure 5A:
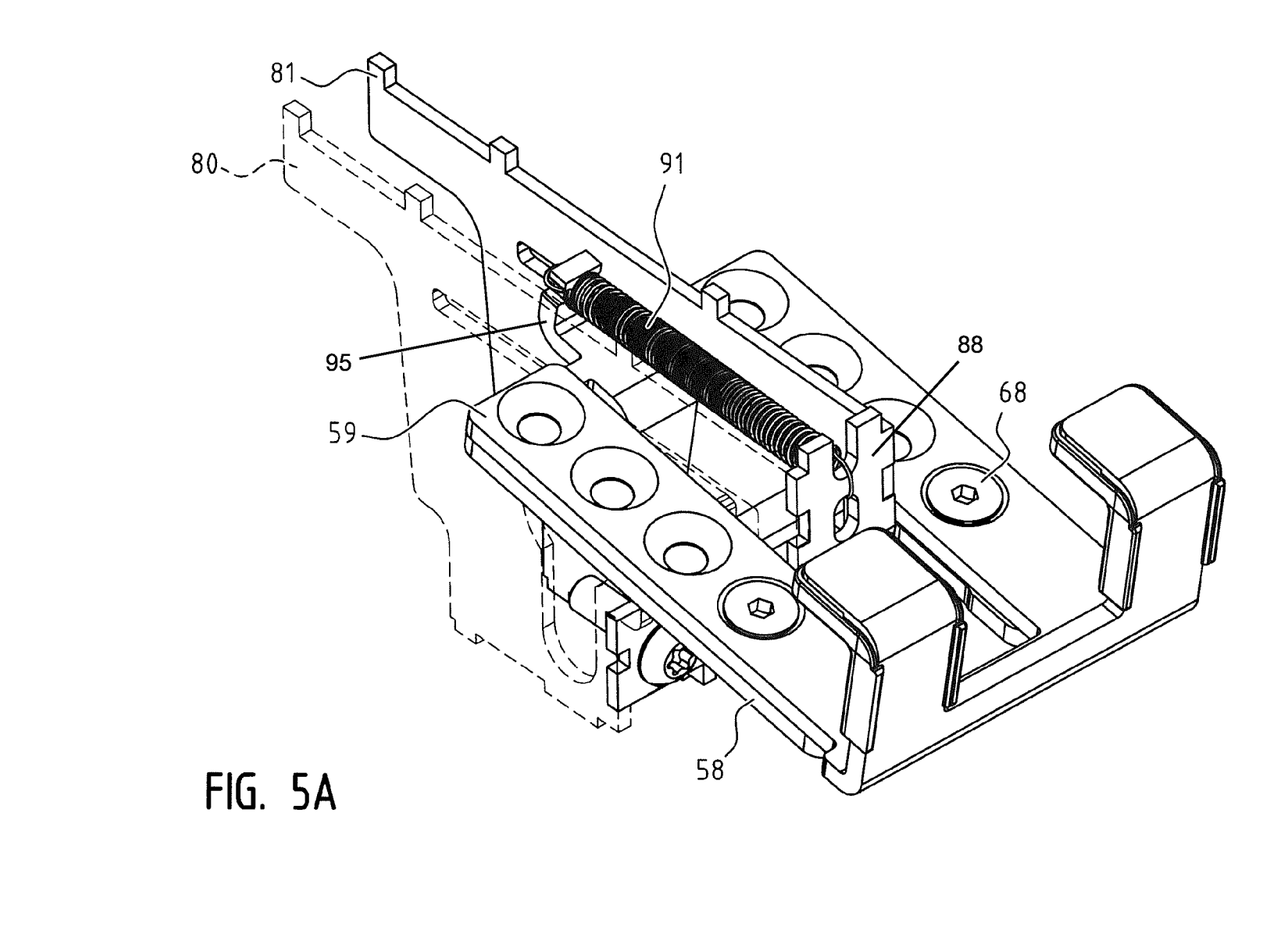
FIGS. 5A-5C are perspective views from different angles of view of the presentation device in the second position, wherein the displaceable frame part is in the extended, opened state.
Figure 5B:
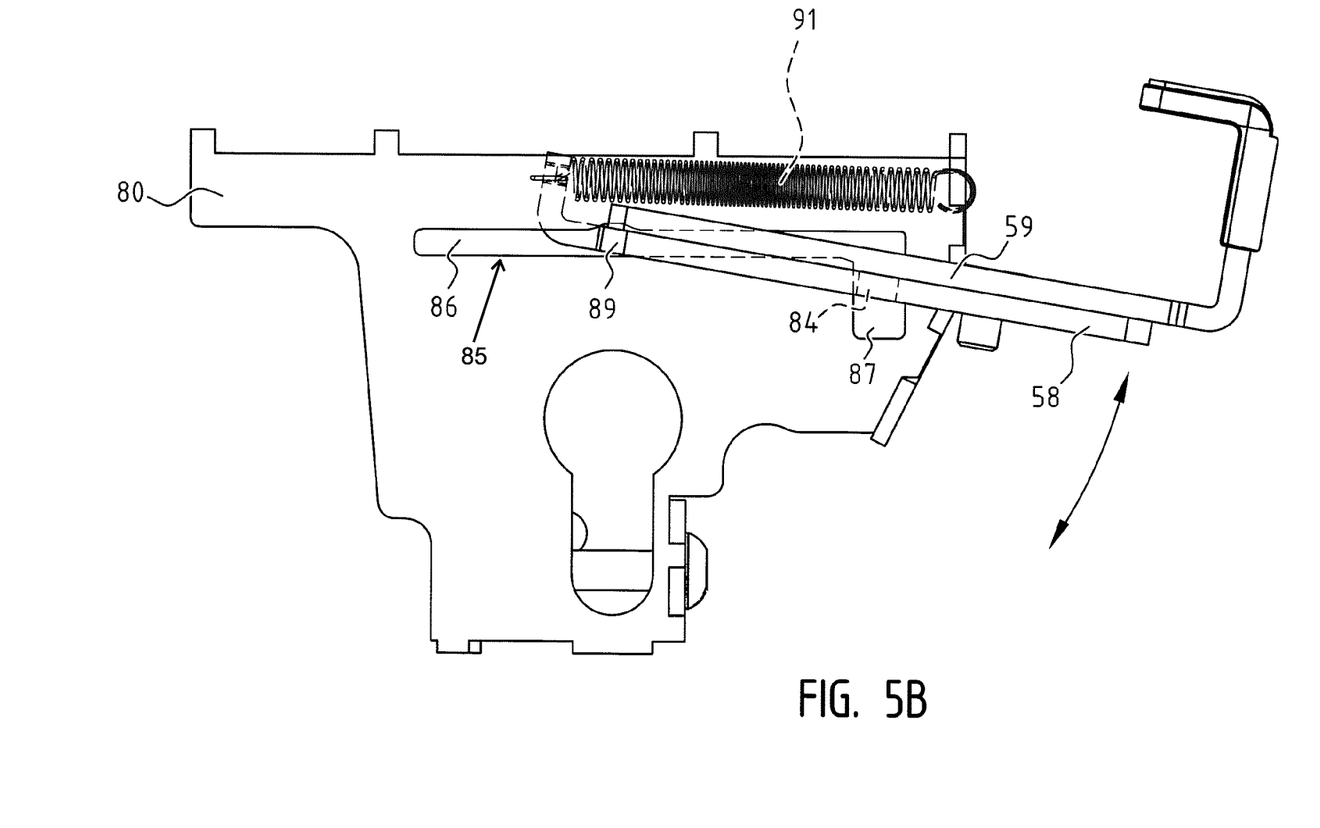
Figure 5C:
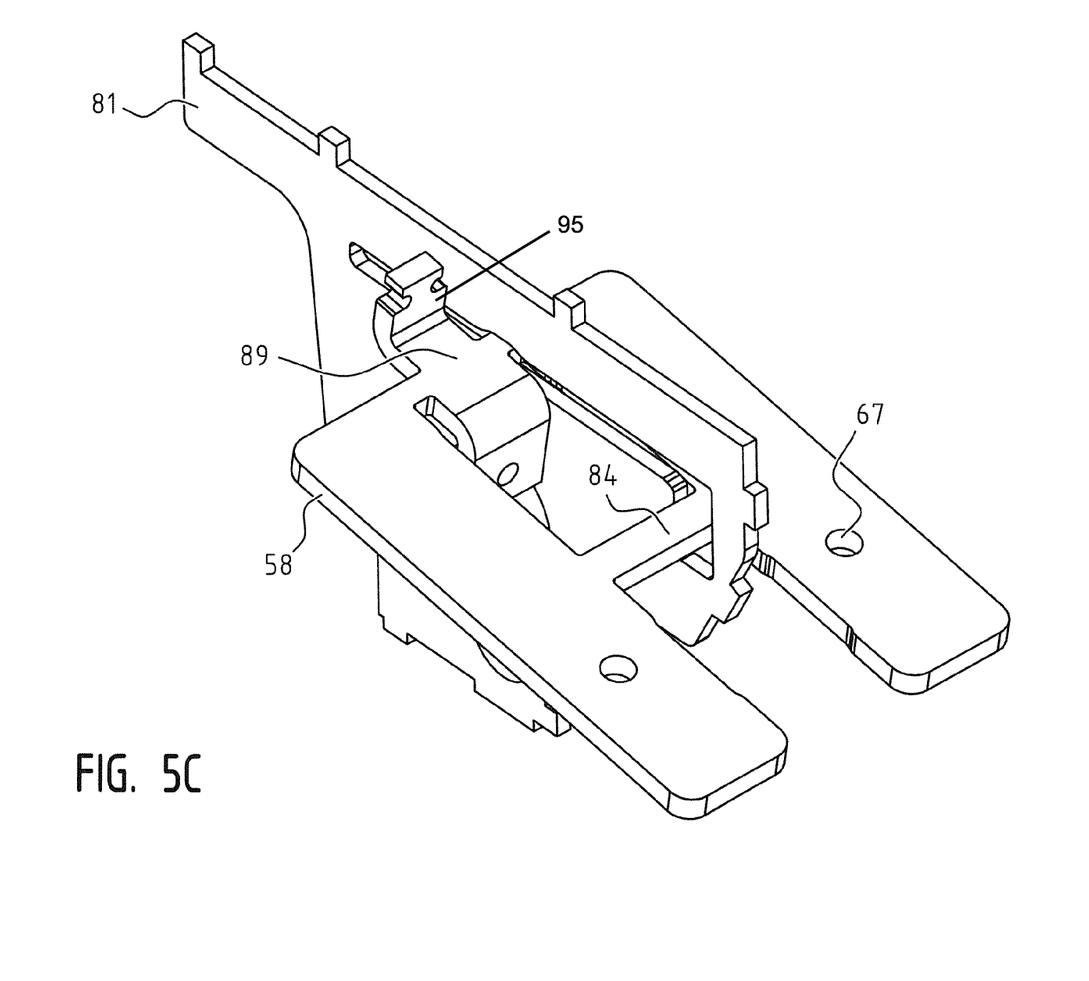

FIG. 5A shows the second, open position of enclosing space 11. Key 90 is still turned, lock 92 is still unlocked. Spring 91 is now no longer under tension. Enclosing space 11 is now no longer blocked at all on one side, and a possible portable media display unit can be easily slid out of enclosing space 11.

During closing of the enclosing space the reverse process takes place, going from the position in FIG. 5A via the position in FIG. 4 to the position in FIG. 3. This takes place by first pushing displaceable frame part (gripper arm) 50 upward (direction $P_2$) and then pressing it inward (direction $P_1$). Spring 91 is hereby tensioned again. Lock 92 then "snaps" back into the locked position and key 90 can once again be removed.

The dimensions of enclosing space 11 can be adapted to the size and/or shape of the display unit by adjusting the frame parts (the stationary frame parts 51-56 which are non-displaceable during use as well as the displaceable frame part (gripper arm) 50), this being shown particularly in FIG. 1. Frame part 51, of which the hook comprising upright stop part 31 and lying stop part 41 forms part, can thus be adjusted in lateral direction (i.e. the length direction). The frame part 51 is enclosed in a slot on the underside of end surface 4 and can slide reciprocally in the slot as soon as a fixation means, such as an Allen screw 61 which engages via an opening in end surface 4 on the frame part 51, enables this sliding (for instance by loosening Allen screw 61). Frame part 52, of which the hook comprising upright stop part 32 and lying stop part 42 forms part, can be adjusted after loosening of a similar Allen screw 61. The same applies for the other arms 53-56. The frame part 50 displaceable in the guide can also be adjusted in similar manner. As shown in FIG. 3, frame part 50 comprises an upper profile part 59 on which the above stated hook comprising upright stop part 30 and lying stop part 40, and the hook comprising upright stop part 30' and lying stop part 40' are formed, and a lower profile part 58. The lower and upper profile parts 58, 59 are displaceable in the above-mentioned guide (in the directions $P_1$ and $P_2$). The two profile parts are however also adjustable in longitudinal direction relative to each other. The two profile parts are provided for this purpose with openings 67 in which Allen screws 68 are arranged. The profile parts can slide relative to each other when Allen screws 68 are loosened, and the two profile parts can be secured again by tightening screws 68. The overall length of frame part 50 can hereby be adapted as desired, depending on the shape and dimensions of the display unit to be enclosed in enclosing space 11.

While the displaceable frame part 50 can also be displaced during use, so with display unit placed in enclosing space 11, the displacement of frame part 50 and the other frame parts 51-56 for the purpose of adjustment to the shape and dimensions of the display unit is not possible during use. None of the Allen screws 61, 68 is accessible from outside when there is a portable media display unit in enclosing space 11, since the display unit then covers the support surface and the Allen screws 61 provided therein, and Allen screws 68 are positioned just below support surface 4. Use cannot therefore be made of the adjustability of frame parts 50-56 to release the portable media display unit from the enclosed situation.

The presentation device can for instance be manufactured wholly or largely from steel, particularly those parts which are important for fixedly holding the media display unit. Use is preferably made of hardened steel.

The present invention is not limited to the embodiments thereof described herein. The rights are defined by the following claims, within the scope of which numerous modifications can be envisaged.

The invention claimed is:

1. A presentation device for presenting a portable, handheld electronic media display unit, the presentation device comprising:
   a support for supporting the display unit, the support comprising a foot which is provided with a support surface and which is to be attached to or placed on a base surface;
   a number of frame parts mounted on the support and provided with integral hooks, each hook comprising an upright stop part and a lying stop part, wherein the support surface and the upright stop parts and lying stop parts of the hooks of the number of frame parts together form an enclosing space in which the display unit can be held, wherein the enclosing space has sides, and wherein at least one of the frame parts extending along one of the sides of the enclosing space is an at least one displaceable frame part and takes a displaceable form relative to the support surface of the support;
   a guide which is configured to slidingly guide the displacement of the at least one displaceable frame part, from a first, closed state of the presentation device in which the at least one hook of the at least one displaceable frame part is positioned over an edge of the display unit and the display unit is non-removable from the enclosing space, along a path in which the at least one hook of the at least one displaceable frame part is configured to move outward parallel to the support surface as well as transversely to the support surface in the direction of the foot to a second, opened state of the presentation device, the second, opened state being configured to place the display unit in the presentation device and to remove the display unit therefrom; and
   an adjusting mechanism for adjusting the position of the at least one of the number of frame parts relative to the support surface so as to make the presentation device suitable for display units with differing dimensions, wherein the adjusting mechanism is arranged so as to be inaccessible when the presentation device is in the first, closed state and a fitting display unit is enclosed in the device.

2. The presentation device as claimed in claim 1, wherein the enclosing space forms a substantially flat rectangular space.

3. The presentation device as claimed in claim 2, wherein the at least one displaceable frame part is arranged along one of the four sides of the enclosing space.

4. The presentation device as claimed in claim 1, wherein only the at least one displaceable frame part arranged along one side of the enclosing space is displaceable via the guide.

5. The presentation device as claimed in claim 4, wherein the number of frame parts except the at least one displaceable frame part remain stationary during opening or closing of the enclosing space.

6. The presentation device as claimed in claim 1, comprising:
   a locking mechanism for locking the at least one displaceable frame part in the first, closed state of the presentation device.

7. The presentation device as claimed in claim 6, wherein the locking mechanism is configured to come into operation during displacement of the at least one displaceable frame part to bring the presentation device into the first, closed state.

8. The presentation device as claimed in claim 1, wherein the at least one displaceable frame part is displaceable via the guide in a first movement in the plane of the support surface and in a second movement transversely to the plane of the support surface.

9. The presentation device as claimed in claim 1, wherein the at least one displaceable frame part is displaceable via the guide in a combined movement in the plane of the support surface and transversely to the plane of the support surface.

10. The presentation device as claimed in claim 1, wherein one or more spring units are arranged in the support surface for the purpose of pressing the display unit under spring force against the lying stop parts of the hooks of the frame parts.

11. The presentation device as claimed in claim 10, wherein the spring unit comprises a tongue pushed upward from the support surface by a compression spring.

12. The presentation device as claimed in claim 1, wherein the foot comprises a first and a second foot part, wherein a pivoting unit is arranged between the first and second foot parts for the purpose of pivoting the support surface and fixing thereof in a desired position.

13. The presentation device as claimed in claim 12, wherein the pivoting unit is embodied to rotate the support surface with enclosing space over at least one axis, whereby the angle of a display unit present in the device can be changed.

14. The presentation device as claimed in claim 1, comprising a biasing member for biasing the at least one displaceable frame parts to bring the presentation device in the second, opened state.

* * * * *